United States Patent
Ota

(10) Patent No.: US 12,204,926 B2
(45) Date of Patent: Jan. 21, 2025

(54) VIRTUAL MIGRATION BASED ON OPERATION STATUS

(71) Applicant: Nippon Telegraph and Telephone Corporation, Tokyo (JP)

(72) Inventor: Masazumi Ota, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 514 days.

(21) Appl. No.: 17/619,540

(22) PCT Filed: Jun. 26, 2019

(86) PCT No.: PCT/JP2019/025321
§ 371 (c)(1),
(2) Date: Dec. 15, 2021

(87) PCT Pub. No.: WO2020/261412
PCT Pub. Date: Dec. 30, 2020

(65) Prior Publication Data
US 2022/0229689 A1 Jul. 21, 2022

(51) Int. Cl.
*G06F 9/455* (2018.01)
(52) U.S. Cl.
CPC .. *G06F 9/45558* (2013.01); *G06F 2009/4557* (2013.01)
(58) Field of Classification Search
CPC . G06F 9/45558; G06F 2009/4557; G06F 9/50
See application file for complete search history.

(56) References Cited

U.S. PATENT DOCUMENTS

2014/0019974 A1* 1/2014 Siu .................. G06F 9/4856
718/1

OTHER PUBLICATIONS

VMware Inc., "DRS Performance," Vmware vSphere 6.5, dated Nov. 2016, retrieved from URL <www.vmware.com/content/dam/digitalmarketing/vmware/en/pdf/techpaper/drs-vsphere65-perf.pdf>, 27 pages.
VMware Inc., "Japan Cloud Infrastructure Blog," VMware Japan Blog, dated 2019, retrieved on Jun. 15, 2019, retrieved from URL <blogs.vmware.com/jp-cim/2017/10/vexpert-nakagawa-vmware-vsphere-6-5-part6.html>, 15 pages (with English Translation).

* cited by examiner

*Primary Examiner* — Eric C Wai
(74) *Attorney, Agent, or Firm* — Fish & Richardson P.C.

(57) ABSTRACT

A virtualization infrastructure control apparatus (10) includes an operation parameter monitoring unit (122) configured to acquire an operation parameter, a resource monitoring unit (121) configured to acquire predetermined load information, and a migration determination unit (111). The migration determination unit (111) determines to execute live migration when the migration determination unit (111) determines that the operation parameter satisfies a predetermined operation condition and that a load is low by comparing a predetermined load information with a predetermined threshold, whereas the migration determination unit (111) determines to execute healing when the migration determination unit (111) determines that the operation parameter does not satisfy the predetermined operation condition or that the load is high by comparing the predetermined load information with the predetermined threshold.

3 Claims, 6 Drawing Sheets

| Compute ID | ALLOCATION DESTINATION |
|---|---|
| #0 | VM#1, VM#2, VM#5 |
| #1 | VM#3, VM#10, VM#22 |
| #2 | VM#4, VM#33, VM#6 |
| #3 | VM#11, VM#44 |
| ⋮ | ⋮ |

| App | App ID | VM ID |
|---|---|---|
| VNF1 | #01 | #1, #11 (REDUNDANT CONFIGURATION) |
| VNF2 | #02 | #2, #22 (REDUNDANT CONFIGURATION) |
| VNF3 | #03 | #3, #33 (REDUNDANT CONFIGURATION) |
| ⋮ | ⋮ | ⋮ |
| VNF10 | #010 | #5, #6 |

VIRTUAL MIGRATION BASED ON OPERATION STATUS

CROSS-REFERENCE TO RELATED APPLICATIONS

This application is a National Stage application under 35 U.S.C. § 371 of International Application No. PCT/JP2019/025321, having an International Filing Date of Jun. 26, 2019. The disclosure of the prior application is considered part of the disclosure of this application, and is incorporated in its entirety into this application.

TECHNICAL FIELD

The present invention relates to a virtualization infrastructure control apparatus, a virtualization infrastructure control method, and a virtualization infrastructure control program which execute migration in a virtualization infrastructure.

BACKGROUND ART

In recent years, the use of network functions virtualization (NFV), which applies virtualization technology, has been increasing in telecommunication services. In network virtualization, network functions that are conventionally implemented using dedicated hardware are converted to software to run on general-purpose servers. By applying such network function virtualization technology to carrier networks, it is expected to achieve both scalability and reliability in an economical manner, rapid service delivery, flexible resource allocation according to the demand of each service, service deployment that is not limited by the lifetime of the hardware, and the like.

A virtualization infrastructure refers to a system that abstracts and hides physical resources such as servers and networks using the virtualization technology, and provides a common infrastructure for a plurality of applications and services.

On a virtualization infrastructure, it is easy to create new virtual machines (VMs)/containers or delete existing VMs/containers, and there are cases in which a healing method, which involves suspension of the processing, is used when migrating applications mounted on the virtualization infrastructure in carrier NWs. The migration refers to migrating a system or software to a different physical device. Specifically, in the case of a system with an ACT (Active)/SBY (Standby) configuration, migration is often implemented using a healing process that restarts the SBY side in another physical server.

In addition, there is a method of performing migration while maintaining the processing performance of a VM/container itself. Live migration, a typical technique of such a method, can perform migration without interrupting the service.

As techniques of determining the condition for execution of the migration in the virtualization infrastructure, for example, Distributed Resource Scheduler (DRS) of VMware vSphere ("VMware vSphere" is a registered trademark) is known (see NPTL 1). With the DRS, processes such as migration execution and selection of the migration destination host can be performed by confirming a threshold of a CPU, a memory, and the like (see NPTL 2).

CITATION LIST

Non Patent Literature

NPTL 1: "DRS PERFORMANCE," [online], VMware, [searched on Jun. 15, 2019], the Internet <https://www.vmware.com/content/dam/digitalmarketing/vmware/en/pdf/techpaper/drs-vsphere65-perf pdf>

NPTL 2: "Japan Cloud Infrastructure Blog," [online], VMware, [searched on Jun. 15, 2019], the Internet <https://blogs.vmware.com/jp-cim/2017/10/vexpert-nakagawa-vmware-vsphere-6-5-part6.html>

SUMMARY OF THE INVENTION

Technical Problem

When migration is executed in the system of the virtualization infrastructure described above, a healing method raises the following problems.

(1) Because involving service suspension, the healing method needs to be applied to a SBY system, and requires a lot of associated tasks such as system switching.
(2) Healing process requires processes such as pre- and post-configuring.
(3) Because the healing method involves SBY system down, a lot of time is required for single-system operation.

In contrast, live migration does not involve the generation of VMs/containers, and therefore it has the advantage of completing the process in a shorter time than healing. However, in applications where memory updates frequently occur and the case where there is a limitation on operating conditions in execution of live migration, the process may not be completed due to memory transfer timeout, or the process may take more time than healing.

In view of the above-described points, an object of the present invention is to provide a virtualization infrastructure control apparatus, a virtualization infrastructure control method, and a virtualization infrastructure control program that can determine, from healing and live migration, an appropriate migration method and execute it in accordance with a service operation status.

Means for Solving the Problem

A virtualization infrastructure control apparatus according to an embodiment of the present invention is configured to cause a compute to execute migration of a VM or a container. The virtualization infrastructure control apparatus includes an operation parameter monitoring unit configured to acquire an operation parameter for determining whether there is a state that possibly limits execution of live migration, a resource monitoring unit configured to acquire predetermined load information about the compute, and a migration determination unit configured to select the live migration or healing as an execution method of the migration for each VM or container mounted in the compute and configured to provide a service. The migration determination unit determines to execute the live migration when the migration determination unit determines that the operation parameter satisfies a predetermined operation condition for determining that the live migration is executable and determines that a load is low by comparing the predetermined load information with a predetermined threshold for determining that the live migration is executable, and the migration determination unit determines to execute healing when the migration determination unit determines that the operation parameter does not satisfy the predetermined operation condition or determines that the load is high by comparing the predetermined load information with the predetermined threshold.

Effects of the Invention

According to the present invention, it is possible to provide a virtualization infrastructure control apparatus, a virtualization infrastructure control method, and a virtualization infrastructure control program that can determine an appropriate migration method from healing and live migration, and execute the method in accordance with a service operation status.

BRIEF DESCRIPTION OF DRAWINGS

FIG. 2 is a drawing illustrating an example of a data configuration of a resource management table (resource management information) according to the present embodiment.

DESCRIPTION OF EMBODIMENTS

Next, an embodiment of the present invention (hereinafter referred to as "present embodiment") will be described. First, a virtualization infrastructure control system 1 including a virtualization infrastructure control apparatus 10 according to the present embodiment (see FIG. 1) is described.

Figure 1:
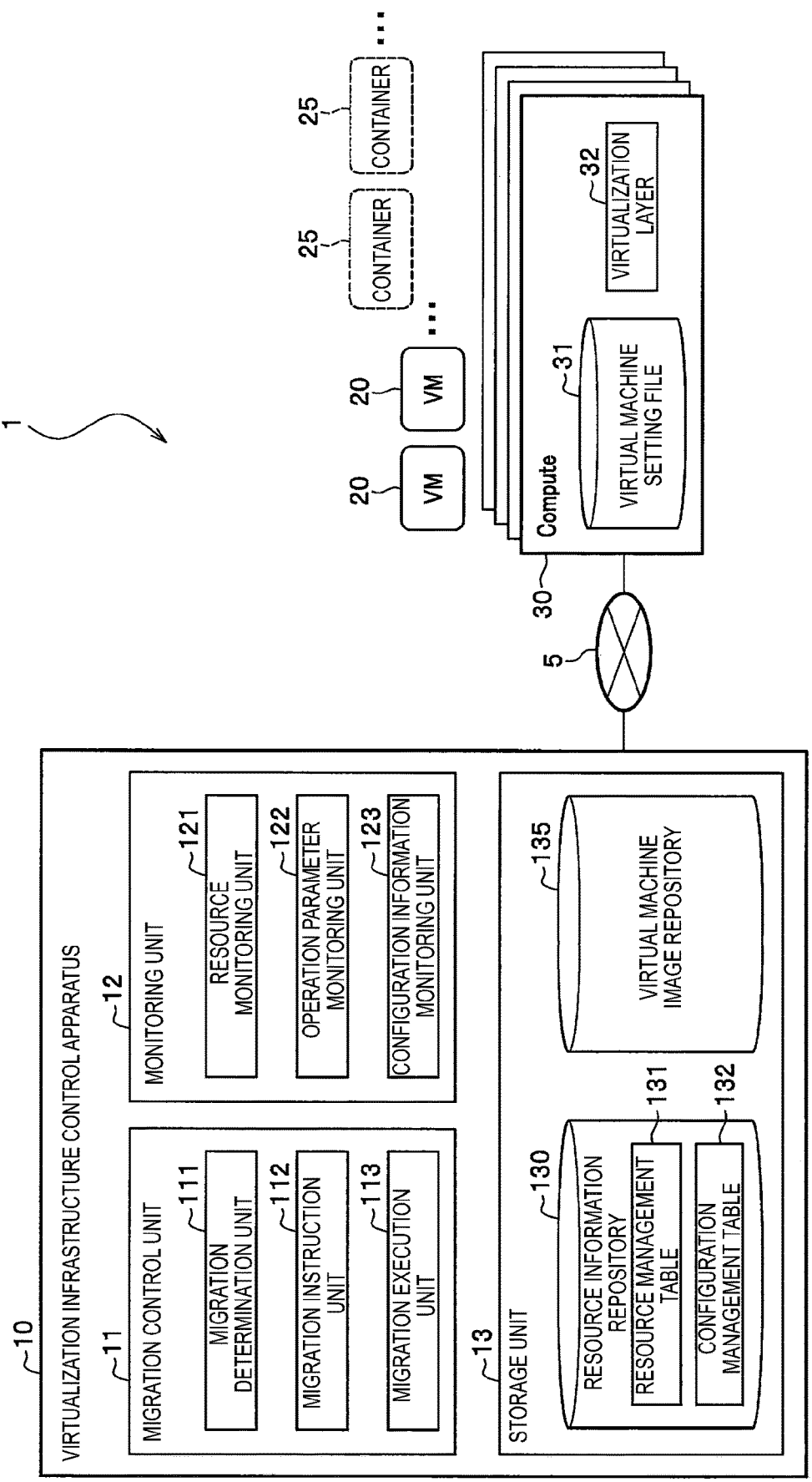
FIG. 1 is a block diagram illustrating a configuration of a virtualization infrastructure control system including a virtualization infrastructure control apparatus according to an embodiment of the present invention.

FIG. 1 is a block diagram illustrating a configuration of the virtualization infrastructure control system 1 including the virtualization infrastructure control apparatus 10 according to the present embodiment.

In the virtualization infrastructure control system 1, one or more computes 30 (physical resource: a host (computer) where a VM/container operates) and the virtualization infrastructure control apparatus 10 are communicatively connected to each other through a network (NW) 5. Note that the following embodiment describes an example case where a VM 20 is built on the compute 30, but the same operational effects can be obtained also in the case where a container 25 is built on the compute 30.

In the compute 30, one or more VMs 20 can be built as a virtualization environment on the basis of the control of the virtualization infrastructure control apparatus 10. In addition, in the VM 20, one or more applications can be disposed (mounted), and a service based on a request from a user terminal (not illustrated) is provided.

As illustrated in FIG. 1, the compute 30 includes a virtual machine setting file 31 and a virtualization layer 32. The virtual machine setting file 31 stores setting information of the VM 20. The virtualization layer 32 controls generation and processing of the VM 20.

The virtualization infrastructure control apparatus 10, which is communicatively connected to each of the compute 30, the VM 20, and the like, performs resource allocation and control of the VM 20, and provides instructions related to migration of the VM 20.

The virtualization infrastructure control apparatus 10 will be described in detail below.

Virtualization Infrastructure Control Apparatus

The virtualization infrastructure control apparatus 10 according to the present embodiment determines whether the compute 30 satisfies an operation condition under which live migration can be executed, and monitors the operation statuses (such as "operation parameter" and "load information" described later) of the compute 30 and the VM 20 to determine, from healing and live migration, an appropriate migration method and execute it. More specifically, in execution of the migration of each VM 20, the virtualization infrastructure control apparatus 10 determines to execute live migration when the operation condition is satisfied and the load is low, whereas the virtualization infrastructure control apparatus 10 determines to execute healing when the operation condition is not satisfied or the load is high.

Further, in migration of a plurality of the VMs 20, the virtualization infrastructure control apparatus 10 determines the execution order of the migration in consideration of the influence per service. In this manner, the influence of the migration on the service can be reduced.

The virtualization infrastructure control apparatus 10 illustrated in FIG. 1 is implemented with a computer including a control unit (not illustrated), an input-output unit (not illustrated) a storage unit 13, and the like.

The input-output unit is composed of a communication interface for transmitting and receiving information, and an input-output interface for transmitting and receiving information to and from an input apparatus such as a touch panel and a keyboard and an output apparatus such as a monitor.

The storage unit 13 is composed of a flash memory, a hard disk, a random access memory (RAM), and the like. As illustrated in FIG. 1, the storage unit 13 of the virtualization infrastructure control apparatus 10 stores a resource information repository 130 and a virtual machine image repository 135.

Figure 3:
FIG. 3 is a drawing illustrating an example of a data configuration of a configuration management table according to the present embodiment.

The resource information repository 130 stores a resource management table 131 (resource management information) including information about the VM 20 built in each compute 30 (information about resource allocation destination) (see FIG. 2), and a configuration management table 132 (configuration management information) that stores the configuration information of the VM 20 that executes an application (see FIG. 3). In addition, the virtual machine image repository 135 stores an VM image that is a template for activation of a virtual instance (VM) including an installed guest OS.

Note that the storage unit 13 stores a program (virtualization infrastructure control program) for executing each function of the control unit, and information (such as information about a threshold described later) required for the processing of the control unit. Note that the storage unit 13 includes other existing information required for implementing a virtualization infrastructure.

FIG. 2 is a drawing illustrating an example of a data configuration of the resource management table 131 (resource management information) according to the present embodiment.

The resource management table 131 stores information about "allocation destination" in association with "Compute ID" that is identification information of the compute 30.

This "allocation destination" stores the identification information of the VM 20 built in the compute 30 represented by the "Compute ID". For example, in FIG. 2, the VMs 20 of "VM #1", "VM #2", and "VM #5" are allocated to the compute 30 with the Compute ID of "#0".

Returning back to FIG. 1, the control unit includes a migration control unit 11 and a monitoring unit 12. Note that the control unit also includes other existing functions required for implementing a virtualization infrastructure.

The monitoring unit 12 monitors configurations and load statuses of the compute 30 and the VM 20, and includes a resource monitoring unit 121, an operation parameter monitoring unit 122, and a configuration information monitoring unit 123.

The resource monitoring unit 121 monitors each of the compute 30 and the VM 20, and acquires information (predetermined load information) representing load statuses, such as CPU utilization, memory utilization, and the like as metrics information. Furthermore, in the predetermined load information, the image size, the disk input/output (I/O) of the local disk, the memory installation amount, the memory update frequency, the effective NW band width and the like are set as monitoring objects, for example.

The operation parameter monitoring unit 122 acquires the status of the operation parameter set in the compute 30. The status of the operation parameter is, for example, information representing operation conditions that may possibly limit execution of live migration, such as whether emulatorpin of a CPU allocation status is specified, whether a shared Disk is mounted, whether CPU pinning is specified, and whether Single Root I/O Virtualization (SR-MY) is used. Of the operation parameters, the operation parameter monitoring unit 122 monitors a status of a predetermined operation parameter set in advance.

The operation parameter monitoring unit 122 may acquire the status of the operation parameter by confirming the virtual machine setting file 31, or may acquire the status of the operation parameter by making a query to each VM 20.

The configuration information monitoring unit 123 acquires configuration information of the VM 20 that provides a service by executing an application subjected to movement (migration). For example, the configuration information includes information about a plurality of the VMs 20 that operate an application in coordination with each other, and information representing that the VM 20 that executes an application has a redundant configuration (ACT/SBY). Here, the information about the redundant configuration (ACT/SBY) includes information representing whether the VM 20 is in the ACT state or the SBY state at the current time point and the like. The configuration information monitoring unit 123 stores the acquired configuration information in the configuration management table 132 in the resource information repository 130.

FIG. 3 is a drawing illustrating an example of a data configuration of the configuration management table 132 according to the present embodiment.

The configuration management table 132 stores the IDs (identifiers)(VM IDs) of the VMs 20 that operate in coordination with each other in association with an application name (App) and an application ID (App ID).

As illustrated in FIG. 3, for example, it is indicated that regarding the configurations of the VMs 20 corresponding to the application with an application name (App) of "VNF1" and an application ID (App ID) of "#01", the VMs 20 with VM IDs "#1" and "#11" are a pair of redundant configurations (ACT/SBY). In addition, it is indicated that regarding the application with an application name (App) of "VNF10" and an application ID (App ID) of "#010", a series of services (one service) is provided by two VMs 20 with VM IDs of "#5" and "#6".

Returning back to FIG. 1, the migration control unit 11 performs a control of determining an appropriate migration method from healing and live migration and providing an instruction for executing it to the compute 30. The migration control unit 11 includes a migration determination unit 111, a migration instruction unit 112, and a migration execution unit 113.

For example, when receiving, from a network management apparatus (not illustrated) or the like, an instruction to perform migration ("migration request" described later) from the physical apparatus (the compute 30) of the current time point to another physical apparatus (the compute 30) for the VM 20 under service for the purpose of maintenances and upgrades of the system and the like, the migration determination unit 111 executes the following process.

The migration determination unit 111 determines (selects) an appropriate migration method from healing and live migration in a unit of the VM 20 through the use of the metrics information (load information) acquired by the resource monitoring unit 121 and/or the status information of the operation parameter acquired by the operation parameter monitoring unit 122.

More specifically, the migration determination unit 111 determines whether a predetermined operation condition for executing live migration is satisfied through the use of the operation parameter information acquired by the operation parameter monitoring unit 122. Then, the migration determination unit 111 determines to execute migration by healing when the predetermined operation condition is not satisfied.

In addition, the migration determination unit 111 determines whether live migration is executable on the basis of whether a predetermined determination reference is satisfied through the use of the metrics information representing the load status acquired by the resource monitoring unit 121.

The migration determination unit 111 preliminarily sets an image size, a local disk I/O, a memory installation amount, a memory update frequency, an effective NW band width, and the like as an index used for the determination based on a load status (load information), for example. By setting a predetermined threshold for the employed index of the load status and performing comparison with the threshold, whether live migration is executable is determined. The index of the load status may be a fixed value set in advance, or dynamic change information (such as an available disk space, an available disk reading band, and an available NW bandwidth).

When acquiring the information about the migration method (healing or live migration) determined by the migration determination unit 111 for each VM 20, the migration instruction unit 112 executes the following process.

The migration instruction unit 112 queries the configuration information monitoring unit 123 about the configuration information of the plurality of VMs 20 that execute an application, for example. Note that when receiving the query, the configuration information monitoring unit 123 acquires the latest (current time point) configuration information of the VM 20, makes a response to the migration instruction unit 112, and stores the acquired configuration information in the configuration management table 132. In addition, the configuration information monitoring unit 123 may monitor a change of the configuration information of the VM 20 at a predetermined time interval and store results of the monitoring in the configuration management table 132, and the migration instruction unit 112 may acquire the configuration information.

On the basis of the acquired configuration information, the migration instruction unit 112 determines the execution order of each VM 20 in consideration of influence per service. More specifically, the migration instruction unit 112 determines the execution order of the migration of each VM 20 so as to reduce the sum of the processing time of the live migration or the healing determined for each of the plurality of VMs 20. Note that the present embodiment describes an example case where the migration instruction unit 112 generates instruction information by determining whether the plurality of VMs 20 has redundant configurations and determining the execution order of the migration.

When the migration instruction unit 112 determines that the configurations of the plurality of VMs 20 are redundant configurations on the basis of the acquired configuration information, the migration instruction unit 112 generates instruction information for sequentially executing the migration process (healing/live migration) determined by the migration determination unit 111 for each VM 20.

At this time, when all the migration methods determined for the plurality of VMs 20 having redundant configurations is healing, the migration instruction unit 112 generates instruction information for sequentially executing healing for each of the plurality of VMs 20. When all the migration methods determined for the plurality of VMs 20 having redundant configurations is live migration, the migration instruction unit 112 generates instruction information for sequentially executing live migration for each of the plurality of VMs 20. When the migration methods determined for the plurality of VMs 20 having redundant configurations include both healing and live migration, the migration instruction unit 112 generates instruction information for sequentially executing healing and live migration.

On the other hand, when the migration instruction unit 112 determines that the configurations of the plurality of VMs 20 are not redundant configurations on the basis of the acquired configuration information, the migration instruction unit 112 generates instruction information for executing the migration (healing/live migration) of each VM 20 in parallel. Thus, by executing the migration (healing/live migration) of each VM 20 in parallel, it is possible to reduce the processing time for the migration in the entire service.

Then, the migration instruction unit 112 outputs the generated instruction information to the migration execution unit 113.

The migration execution unit 113 transmits a migration execution notification based on the instruction information acquired from the migration instruction unit 112, to the virtualization layer 32 of the compute 30. In this manner, the migration execution unit 113 causes each compute 30 to execute the migration process.

Specifically, for example, when the migration method based on the instruction information is healing, the migration execution unit 113 causes each compute 30 to execute SBY transition of the VM 20 as necessary. Thereafter, the migration execution unit 113 saves the VM 20 of the SBY system to a different compute 30 by healing. Then, the migration execution unit 113 causes the compute 30 to execute required configuring and the like to perform a system incorporation process through synchronization with the ACT system.

Flow of Process

Next, a flow of a process executed by the virtualization infrastructure control apparatus 10 is described.

Figure 4:
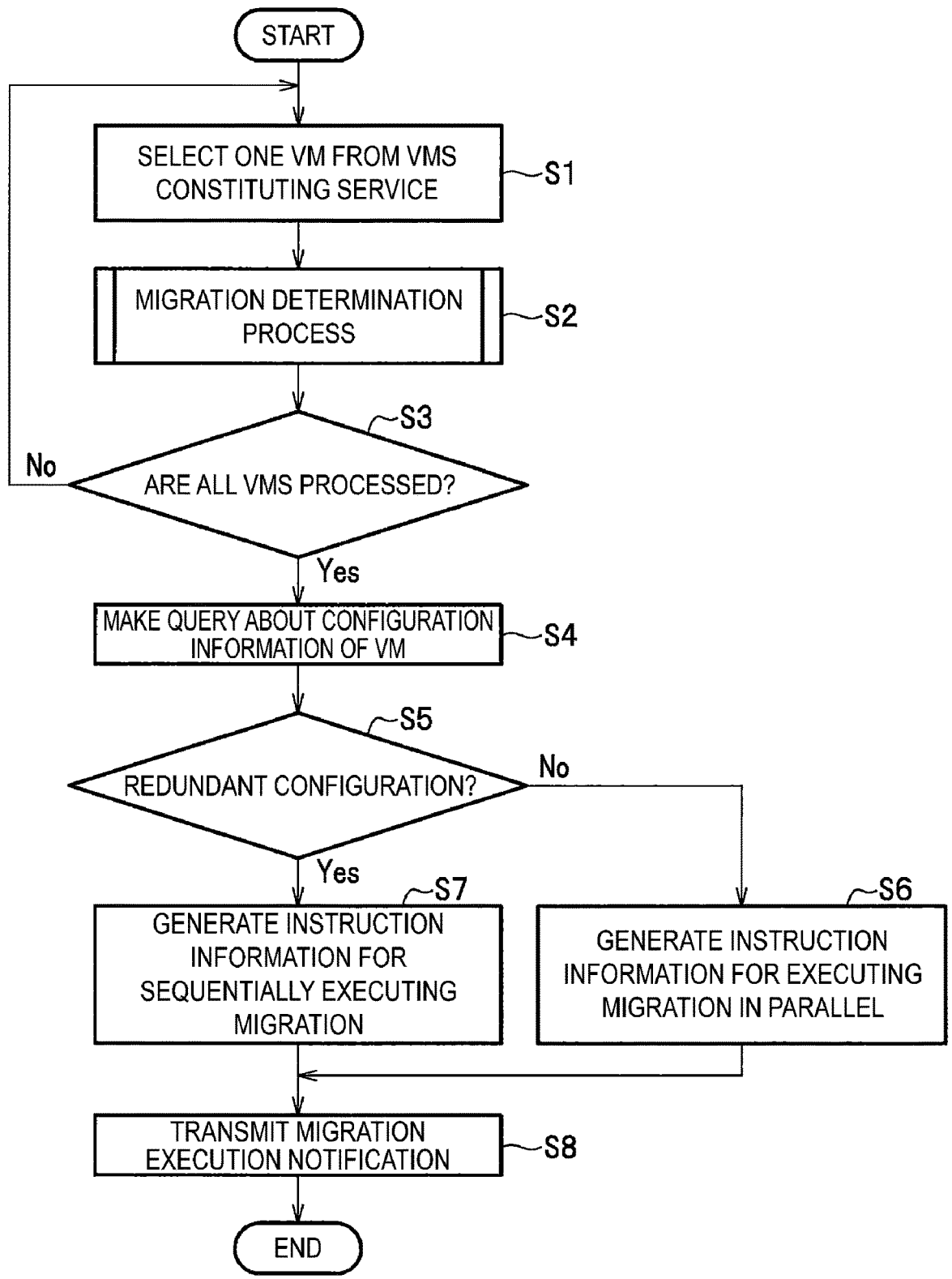
FIG. 4 is a flowchart of an entire flow of a migration method determination process and a migration execution control process according to the present embodiment.

FIG. 4 is a flowchart of an entire flow of a migration method determination process and a migration execution control process according to the present embodiment.

Here, it is assumed that the virtualization infrastructure control apparatus 10 has acquired migration request information (hereinafter referred to as "migration request") related to an application that provides a certain service from a network management apparatus or the like (not illustrated). This migration request includes identification information of one or more VMs 20 to be subjected to migration. Note that in the following description, it is assumed that an instruction of migration of the plurality of VMs 20 that provide a certain service has been received. Note that when only one VM 20 is to be subjected to migration, a migration method determination process (FIG. 5) is performed to select and execute healing or live migration.

First, the migration determination unit 111 of the virtualization infrastructure control apparatus 10 refers to the migration request to select one of the plurality of VMs 20 constituting the service (step S1).

Subsequently, the migration determination unit 111 executes a migration method determination process (step S2). Through the migration method determination process, the migration determination unit 111 selects healing or live migration as an optimum method for the VM 20. Note that details of the migration method determination process will be described later with reference to FIG. 5.

Next, the migration determination unit 111 determines whether all the VMs 20 constituting the service has been processed (step S3). Then, when there is the VM 20 on which the migration determination process has not been performed (step S3→No), the process is returned to step S1, and the migration method determination process is continued. When the process has been performed on all the VMs 20, the migration determination unit 111 proceeds to the next step S4.

Note that through the migration method determination process of the migration determination unit 111, determination results of the following three cases are obtained for the VMs 20 constituting the service.

(Case 1) Healing is to be executed for all the VMs 20.
(Case 2) Both healing and live migration are to be executed.
(Case 3) Live migration is to be executed for all the VMs 20.

Subsequently, the migration instruction unit 112 of the virtualization infrastructure control apparatus 10 queries the configuration information monitoring unit 123 about the configuration information of the VM 20 constituting the service (step S4). The configuration information monitoring unit 123 acquires the latest configuration information from the virtual machine setting file 31 of the compute 30 and/or each VM 20. At this time, the information acquired by the configuration information monitoring unit 123 includes information representing whether each VM 20 has a redundant configuration, and information representing whether the VM 20 of a redundant configuration is in an ACT state or a SBY state at the current time point. Then, the configuration information monitoring unit 123 stores the acquired configuration information in the configuration management table in the storage unit 13, and responds to the migration instruction unit 112.

Next, the migration instruction unit 112 determines whether the configuration of the VM 20 is a redundant configuration (step S5). Here, when the configuration is not a redundant configuration (step S5→No), the migration instruction unit 112 proceeds to step S6.

At step S6, the migration instruction unit 112 generates instruction information for executing the migration of each VM 20 in parallel. Then, the migration instruction unit 112 outputs the generated instruction information to the migration execution unit 113.

The migration (healing/live migration) of each VM 20 is processed in parallel in the above-described manner, so that the service interruption time can be reduced in the entire service. Note that in consideration of the influence per service of the coordinated operation of the service constituents (VM 20s) and the process load of the compute 30, the migration instruction unit 112 may, for example, divide the VMs 20 to be subjected to execution of the migration process into groups such that the process load of each compute 30 is equalized, and execute the migration process for each group, instead of executing the migration of all the VMs 20 in parallel.

On the other hand, at step S5, when the migration instruction unit 112 determines that the configuration of the VM 20 is a redundant configuration (step S5→Yes), the migration instruction unit 112 generates instruction information for sequentially executing the migration process of each VM 20 at step S7. Then, the migration instruction unit 112 outputs the generated instruction information to the migration execution unit 113.

Here, at step S4, through the use of information representing whether the VM 20 of a redundant configuration is in an ACT state or a SBY state, the migration instruction unit 112 generates instruction information in which the order is set such that the migration process of the VM 20 in a SBY state is performed first. In this manner, the system switching process between the SBY state and the ACT state can be reduced, and thus the service interruption time can be reduced in the entire service.

Next, at step S8, the migration execution unit 113 transmits a migration execution notification based on the instruction information of the migration instruction unit 112 to the virtualization layer 32 of the compute 30 to cause the compute 30 to execute the migration process of each VM 20.

In this manner, the virtualization infrastructure control apparatus 10 can reduce the service interruption time in the entire service by appropriately selecting healing and live migration. In addition, through the use of both healing and live migration, the single-system operation time can be reduced in comparison with the case where all migration processes are executed by healing.

Migration Method Determination Process

Figure 5:
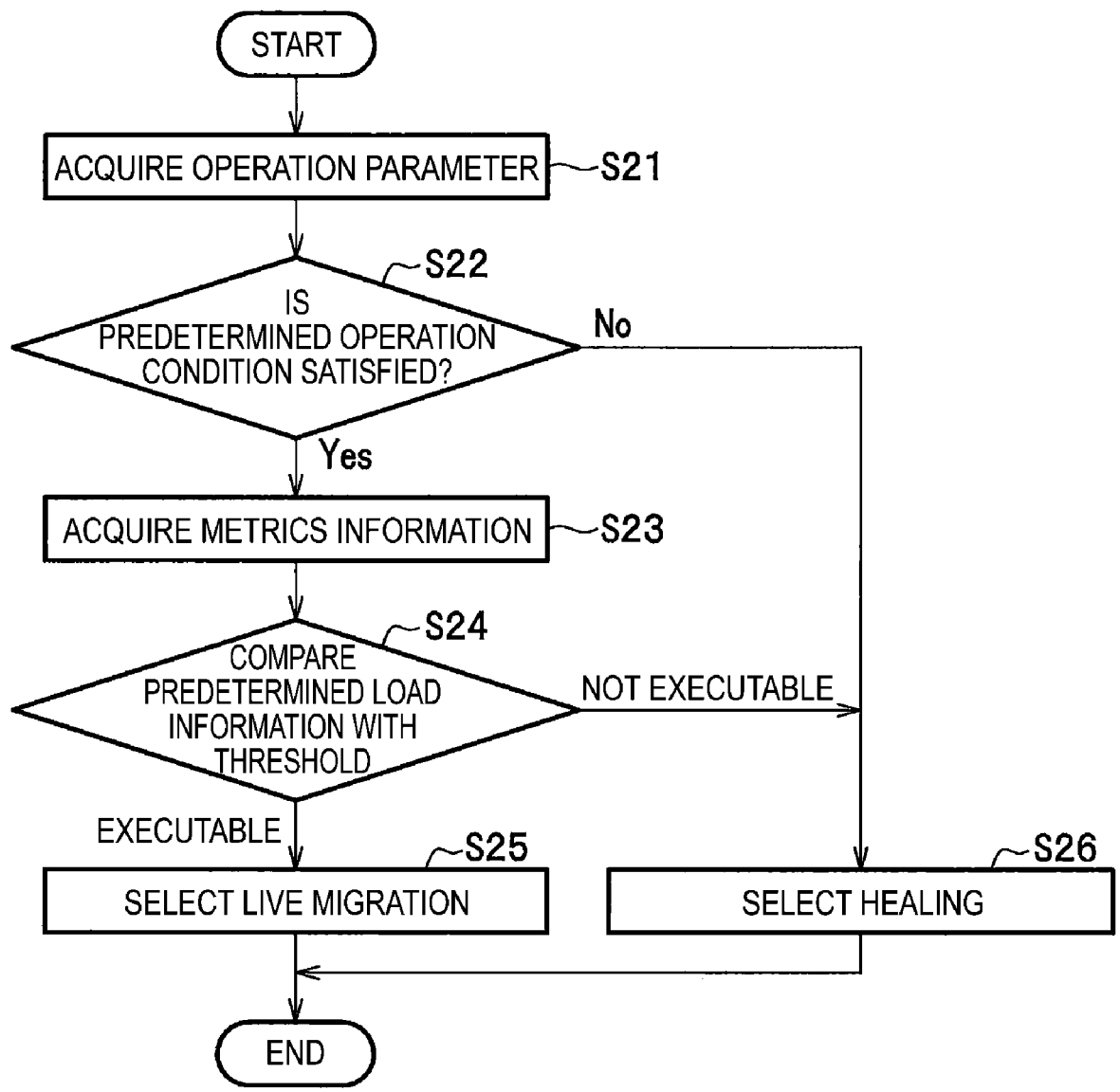
FIG. 5 is a flow flowchart of the migration method determination process according to the present embodiment.

FIG. 5 is a flowchart of a migration method determination process according to the present embodiment.

First, for the VM 20 selected at step S1 in FIG. 4, the migration determination unit 111 specifies the compute 30 allocated to the VM 20 with reference to the resource management table 131. Further, the migration determination unit 111 acquires the operation parameter of the compute 30 through the operation parameter monitoring unit 122 (step S21).

Subsequently, the migration determination unit 111 determines whether the operation state of the acquired operation parameter satisfies a predetermined operation condition under which the live migration is executable (step S22).

As the predetermined operation condition under which the live migration is executable, the migration determination unit 111 determines that the operation condition under which the live migration is executable is satisfied when emulator-pin of CPU allocation status is specified, when the shared Disk is not mounted, when CPU Pinning is not specified, when SR-Mv is not used, and the like, for example.

Here, when the predetermined operation condition is not satisfied (step S22→No), the migration determination unit 111 selects healing as the migration method (step S26).

On the other hand, at step S22, when the predetermined operation condition under which the live migration is executable is satisfied (step S22→Yes), the migration determination unit 111 proceeds to the next step S23.

At step S23, the migration determination unit 111 acquires the metrics information of the VM 20 and the compute 30 in which the VM 20 is mounted through the resource monitoring unit 121.

Subsequently, the migration determination unit 111 determines whether live migration is executable by comparing the predetermined load information (such as the image size, the local disk I/O, the memory installation amount, the memory update frequency, and the effective NW band width) with the threshold set in advance on the basis of the metrics information (step S24).

Then, when the migration determination unit 111 determines that live migration is executable (step S24→executable), the migration determination unit 111 selects live migration as the migration method (step S25). On the other hand, when the migration determination unit 111 determines that the live migration is not executable (step S24→not executable), the migration determination unit 111 selects healing as the migration method (step S26).

In this manner, the virtualization infrastructure control apparatus 10 selects the live migration for migration of a compute that satisfies the predetermined operation condition and has a low load. In addition, the virtualization infrastructure control apparatus 10 can select the healing for migration of a compute that does not satisfy the predetermined operation condition or has a high load. In addition, since the selection from healing and live migration is determined based on the operation status (such as the operation parameter and the load information) at the current time point, the optimum migration method can be selected in accordance with a real-time operation state.

Hardware Configuration

Figure 6:
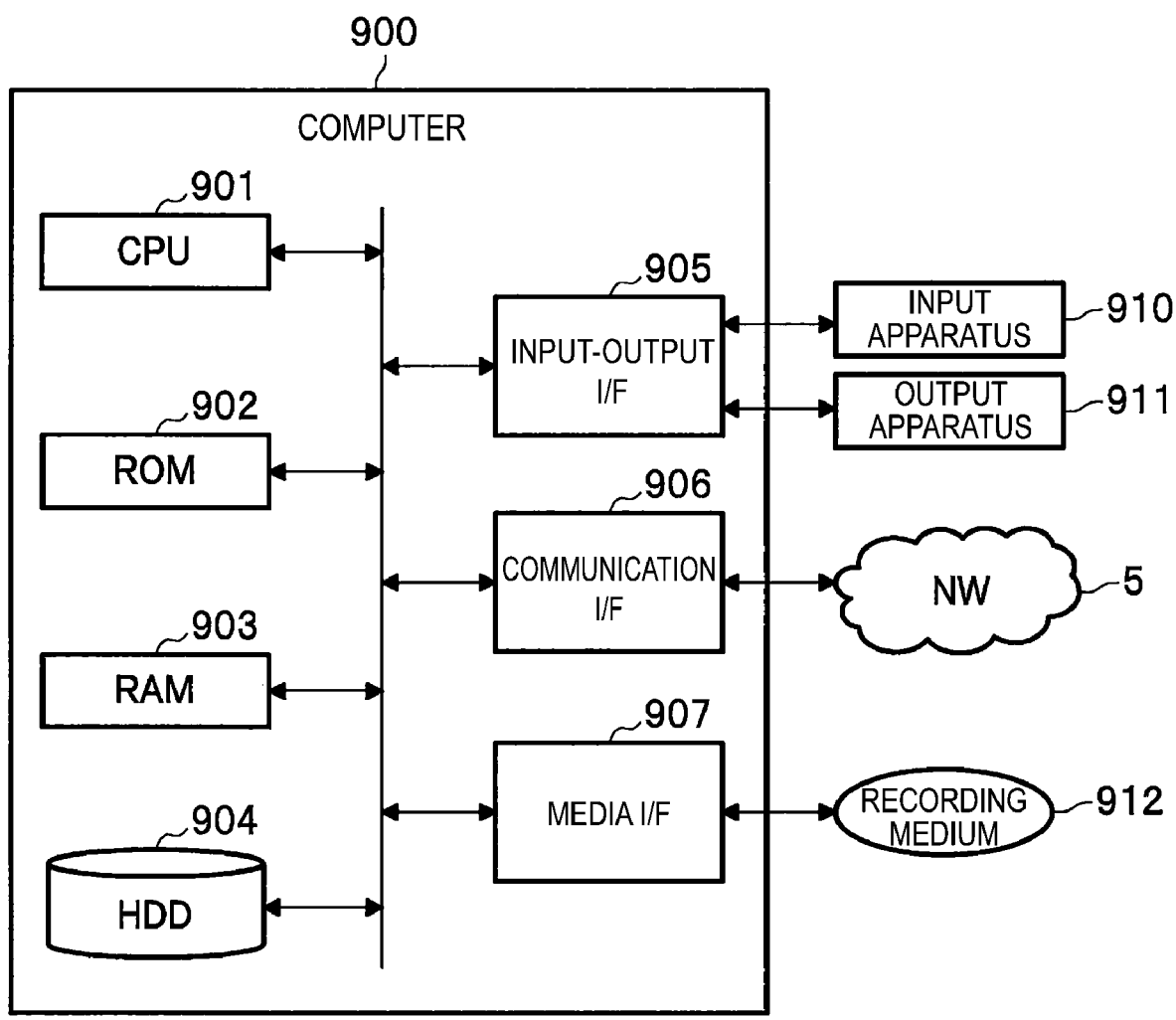
FIG. 6 is a hardware configuration diagram illustrating an example of a computer that implements a function of the virtualization infrastructure control apparatus according to the present embodiment.

The virtualization infrastructure control apparatus 10 according to the present embodiment is implemented with a computer 900 having a configuration illustrated in FIG. 6, for example. FIG. 6 is a hardware configuration diagram illustrating an example of the computer 900 that implements functions of the virtualization infrastructure control apparatus 10. The computer 900 includes a central processing unit (CPU) 901, a read only memory (ROM) 902, a random access memory (RAM) 903, a hard disk drive (HDD) 904, an input-output interface (I/F) 905, a communication I/F 906, and a media I/F 907.

The CPU 901 operates in accordance with a program stored in the ROM 902 or the HDD 904, and performs control with the control unit of FIG. 1 (the migration control unit 11 and the monitoring unit 12). The ROM 902 stores a boot program that is executed by the CPU 901 when the computer 900 is activated, a program for the hardware of the computer 900 and the like.

The CPU 901 controls an input apparatus 910 such as a mouse and a keyboard, and an output apparatus 911 such as a display and a printer through the input-output I/F 905. Through the input-output I/F 905, the CPU 901 acquires data from the input apparatus 910, and outputs the generated data to the output apparatus 911.

The HDD 904 stores a program (virtualization infrastructure control program) executed by the CPU 901, the data used by the program, and the like. The communication I/F 906 receives data from another apparatus (not illustrated)

(such as a network management apparatus) through a communication network (such as the network 5) and outputs it to the CPU 901, and transmits data generated by the CPU 901 to another apparatus through the communication network.

The media I/F 907 reads a program (virtualization infrastructure control program) or data stored in a recording medium 912, and outputs it to the CPU 901 through the RAM 903. The CPU 901 loads, in the RAM 903, a program for an intended process from the recording medium 912 through the media I/F 907, and executes the loaded program. The recording medium 912 is an optical recording medium such as a digital versatile disc (DVD) and a phase change rewritable disk (PD), a magneto-optical recording medium such as a magneto optical disk (MO), a magnetic recording medium, a conductor memory tape medium, a semiconductor memory or the like.

For example, when the computer 900 functions as the virtualization infrastructure control apparatus 10 according to the embodiment, the CPU 901 of the computer 900 executes a program loaded on the RAM 903 to implement the function of the virtualization infrastructure control apparatus 10. In addition, the HDD 904 stores data in the RAM 903. The CPU 901 reads a program for an intended process from the recording medium 912 and executes it. Furthermore, the CPU 901 may read a program for an intended process from another apparatus through the communication network (the network 5).

Effects

Effects of the virtualization infrastructure control apparatus are described below.

The virtualization infrastructure control apparatus according to the present invention is the virtualization infrastructure control apparatus 10 configured to cause the compute 30 to execute migration of the VM 20 or the container 25, the virtualization infrastructure control apparatus 10 including the operation parameter monitoring unit 122 configured to acquire an operation parameter for determining whether there is a state that possibly limits execution of live migration, the resource monitoring unit 121 configured to acquire predetermined load information about the compute 30, and the migration determination unit 111 configured to select live migration or healing as an execution method of the migration for each VM 20 or each container 25 mounted in the compute 30 and configured to provide a service. The migration determination unit 111 determines to execute the live migration when the migration determination unit 111 determines that the operation parameter satisfies a predetermined operation condition for determining that the live migration is executable and determines that a load is low by comparing a predetermined load information with a predetermined threshold for determining that the live migration is executable, and the migration determination unit 111 determines to execute healing when the migration determination unit 111 determines that the operation parameter does not satisfy the predetermined operation condition or determines that the load is high by comparing the predetermined load information with the predetermined threshold.

In this manner, the virtualization infrastructure control apparatus 10 performs the selection from healing and live migration on the basis of the operation status (such as the operation parameter and the load information) at the current time point, so as to select an optimum migration method that matches the real-time operation state. Thus, the virtualization infrastructure control apparatus 10 can reduce the influence of the migration on the service.

In addition, the virtualization infrastructure control apparatus 10 further includes the configuration information monitoring unit 123 configured to acquire configuration information of each VM 20 or each container 25 configured to provide the service, and the migration instruction unit 112 configured to provide an instruction of an execution order of a plurality of the VMs 20 or the containers 25 on a basis of the configuration information to reduce a sum of a processing time of the live migration or the healing determined for the plurality of the VMs 20 or the plurality the containers 25 in an entirety of the service.

In this manner, the virtualization infrastructure control apparatus 10 reduces the sum of the processing time of the live migration or the healing determined for the plurality of the VMs 20 or the plurality of the containers 25 in the entire service. That is, the virtualization infrastructure control apparatus 10 can determine the execution order of the migration related to the VM 20 or the container 25 in consideration of the influence per service of the coordinated operation between the plurality of the VMs 20 or the plurality of the containers 25 constituting the service.

In particular, with the virtualization infrastructure control apparatus 10, since the migration can be performed in combination with live migration and healing, the time of the single-system operation due to SBY system down can be reduced in comparison with the case where all migration operations are executed by healing.

In addition, in the virtualization infrastructure control apparatus 10, the configuration information includes information representing a redundant configuration of a plurality of the VMs 20 or a plurality of containers 25, and when the configuration information is acquired, the migration instruction unit 112 provides an instruction to sequentially execute the live migration or the healing determined for the plurality of the VMs 20 or the plurality the containers 25 when the information representing the redundant configuration is included, and the migration instruction unit 112 provides an instruction to execute the live migration or the healing determined for the plurality of the VMs 20 or the plurality the containers 25 in parallel when no information representing the redundant configuration is included.

In this manner, the virtualization infrastructure control apparatus 10 causes the computes 30 to sequentially execute the migration so as not to suspend the service when the configuration information includes the information representing the redundant configuration of the plurality of VMs 20 or the plurality of the containers 25. In addition, the virtualization infrastructure control apparatus 10 causes the computes 30 to execute the migration in parallel when the configuration information does not include the information representing the redundant configuration of the plurality of VMs 20 or the plurality of the containers 25, and thus, the service interruption time can be reduced.

REFERENCE SIGNS LIST

1 Virtualization infrastructure control system
5 Network
10 Virtualization infrastructure control apparatus
11 Migration control unit
12 Monitoring unit
13 Storage unit
20 VM
25 Container
30 Compute 31 Virtual machine setting file
32 Virtualization layer
111 Migration determination unit
112 Migration instruction unit
113 Migration execution unit
121 Resource monitoring unit
122 Operation parameter monitoring unit
123 Configuration information monitoring unit
130 Resource information repository
131 Resource management table (resource management information)
132 Configuration management table (configuration management information)
135 Virtual machine image repository

The invention claimed is:

1. A virtualization infrastructure control apparatus configured to cause a compute to execute migration of a virtual machine (VM) or a container, the virtualization infrastructure control apparatus comprising:
an operation parameter monitoring unit, including one or more processors, configured to acquire an operation parameter for determining whether there is a state that possibly limits execution of live migration;
a resource monitoring unit, including one or more processors, configured to acquire predetermined load information about the compute;
a migration determination unit, including one or more processors, configured to select the live migration or healing as an execution method of the migration for each VM or container mounted in the compute, each VM or container being configured to provide a service;
a configuration information monitoring unit, including one or more processors, configured to acquire configuration information for the VM or container configured to provide the service; and
a migration instruction unit, including one or more processors, configured to provide an instruction of an execution order of a plurality of VMs or a plurality of containers constituting the service based on the configuration information to reduce a sum of a processing time of the live migration or the healing determined for the plurality of VMs or the plurality of containers in an entirety of the service, wherein the configuration information includes information representing a redundant configuration of the plurality of VMs or the plurality of containers,
when the configuration information is acquired, the migration instruction unit is configured to:
transmit an instruction to a virtualization layer that causes sequential execution of the live migration or the healing determined for the plurality of VMs or the plurality of containers when the information representing the redundant configuration is included; or
transmit an instruction to the virtualization layer that causes execution of the live migration or the healing determined for the plurality of VMs or the plurality of containers in parallel when no information representing the redundant configuration is included;
wherein the migration determination unit executes the live migration when the migration determination unit determines that the operation parameter satisfies a predetermined operation condition for determining that the live migration is executable, and the migration determination unit is configured to determine that a load is low by comparing the predetermined load information with a predetermined threshold for determining that the live migration is executable, and
the migration determination unit executes healing when the migration determination unit determines that the operation parameter does not satisfy the predetermined operation condition, or the migration determination unit is configured to determine that the load is high by comparing the predetermined load information with the predetermined threshold.

2. A virtualization infrastructure control method for a virtualization infrastructure control apparatus configured to cause a compute to execute migration of a virtual machine (VM) or a container,
the virtualization infrastructure control apparatus executing:
acquiring an operation parameter for determining whether there is a state that possibly limits execution of live migration;
acquiring predetermined load information about the compute; and
selecting the live migration or healing as an execution method of the migration for the VM or container mounted in the compute, the VM and the container being configured to provide a service;
acquiring configuration information for the VM or container configured to provide the service; and
providing an instruction of an execution order of a plurality of VMs or a plurality of containers constituting the service based on the configuration information to reduce a sum of a processing time of the live migration or the healing determined for the plurality of VMs or the plurality of containers in an entirety of the service, wherein the configuration information includes information representing a redundant configuration of the plurality of VMs or the plurality of containers,
when the configuration information is acquired,
transmitting an instruction to a virtualization layer that causes sequential execution of the live migration or the healing determined for the plurality of VMs or the plurality of containers when the information representing the redundant configuration is included; or
transmitting an instruction to the virtualization layer that causes execution of the live migration or the healing determined for the plurality of VMs or the plurality of containers in parallel when no information representing the redundant configuration is included;
wherein selecting the live migration or the healing as the execution method comprises:
executing the live migration when the virtualization infrastructure control apparatus determines that the operation parameter satisfies a predetermined operation condition for determining that the live migration is executable, and determining that a load is low by comparing the predetermined load information with a predetermined threshold for determining that the live migration is executable, and
executing healing when the virtualization infrastructure control apparatus determines that the operation parameter does not satisfy the predetermined operation condition, or when determining that the load is high by comparing the predetermined load information with the predetermined threshold.

3. A non-transitory computer readable medium storing one or more instructions causing a compute to execute:

a virtualization infrastructure control method for a virtualization infrastructure control apparatus configured to cause a compute to execute migration of a virtual machine (VM) or a container, the method comprising:

acquiring an operation parameter for determining whether there is a state that possibly limits execution of live migration;

acquiring predetermined load information about the compute; and selecting the live migration or healing as an execution method of the migration for the VM or container mounted in the compute, the VM and the container being configured to provide a service;

acquiring configuration information for the VM or container configured to provide the service; and providing an instruction of an execution order of a plurality of VMs or a plurality of containers constituting the service based on the configuration information to reduce a sum of a processing time of the live migration or the healing determined for the plurality of VMs or the plurality of containers in an entirety of the service, wherein the configuration information includes information representing a redundant configuration of the plurality of VMs or the plurality of containers, when the configuration information is acquired,
transmitting an instruction to a virtualization layer that causes sequential execution of the live migration or the healing determined for the plurality of VMs or the plurality of containers when the information representing the redundant configuration is included; or transmitting an instruction to the virtualization layer that causes execution of the live migration or the healing determined for the plurality of VMs or the plurality of containers in parallel when no information representing the redundant configuration is included;

wherein selecting the live migration or the healing as the execution method comprises:

executing the live migration when the virtualization infrastructure control apparatus determines that the operation parameter satisfies a predetermined operation condition for determining that the live migration is executable, and determining that a load is low by comparing the predetermined load information with a predetermined threshold for determining that the live migration is executable, and executing healing when the virtualization infrastructure control apparatus determines that the operation parameter does not satisfy the predetermined operation condition, or when determining that the load is high by comparing the predetermined load information with the predetermined threshold.

* * * * *